Aug. 25, 1959  N. H. KNIGHT  2,901,328
ISOTHERMAL DISTILLATION MOLECULAR WEIGHT APPARATUS
Filed April 29, 1957

INVENTOR.
NORMAN H. KNIGHT
BY
Robert E. Woodhams
ATTORNEY

United States Patent Office 2,901,328
Patented Aug. 25, 1959

2,901,328

ISOTHERMAL DISTILLATION MOLECULAR WEIGHT APPARATUS

Norman H. Knight, Kalamazoo, Mich., assignor to The Upjohn Company, Kalamazoo, Mich., a corporation of Michigan Application April 29, 1957, Serial No. 655,683

2 Claims. (Cl. 23—253)

This invention relates to an improved apparatus for determining the molecular weight of an unknown substance and, more particularly, relates to an improved apparatus for effecting such determinations by isothermal distillation procedures.

It is well known that when two solutions having a common solvent are enclosed in an evacuated system, with only their vapors in contact, the solvent will distill from the solution having the greater vapor pressure to the solution having the lesser vapor pressure. If the distillation is completed under isothermal conditions, the two solutions will eventually become equimolar. If the one solution contains a substance of known molecular weight and the other solution contains a substance of unknown molecular weight, the molecular weight of the latter can be calculated from the data obtained in such an experiment.

Distillation is enhanced and the reaching of equilibrium is hastened by the use of a reservoir of pure solvent in the system. Because the vapor pressure of the pure solvent is higher than that of either of the solutions, the solvent will distill from the reservoir into both solutions in proportion to their respective molar concentrations and such distillation continues until the solutions become equimolar. The solvent reservoir usually reduces the equilibration time to a matter of two or three days as compared with equilibration times of weeks or even months which may be required for apparatus not employing a solvent reservoir. A suitable apparatus for effecting molecular weight determinations by isothermal distillation and employing a solvent reservoir is disclosed in Childs, C. E., Anal. Chem. 26, 1963–4 (1954).

While the aforementioned apparatus has been found to be an effective and comparatively speedy research tool, it has been found that it has certain shortcomings which lessen its value for research purposes. For example, if the solvent reservoir is not completely empty, contamination of the known substance solution and/or the unknown substance solution may occur when the apparatus is inverted for taking a reading of the volume in the respective graduated tubes. Further, it has been found to be extremely difficult, if not impossible, to remove the unknown substance from the bulb in which it is placed in the distillation apparatus without contaminating the unknown substance or otherwise rendering it unsuitable for further testing or analysis. Since it is sometimes essential to use the same sample for subsequent test or analysis operations, it will be apparent that the prior art apparatus is not completely satisfactory for accomplishing the isothermal distillation procedure in the most desirable manner.

Accordingly, it is an object of this invention to provide an improved apparatus for effecting determination of the molecular weight of an unknown substance by an isothermal distillation procedure.

It is a further object of this invention to provide an improved apparatus, as aforesaid, in which contamination of the unknown sample is less likely to occur than in the case with prior art apparatus used for the same purpose.

It is a further object of this invention to provide an improved apparatus, as aforesaid, in which the unknown sample may be easily removed from the apparatus in an uncontaminated condition.

It is a further object of this invention to provide an improved apparatus, as aforesaid, which can be handled by a technique sufficiently similar to the technique used in handling the apparatus of the prior art that its use will be readily apparent to persons acquainted with procedures of this kind and that it can be utilized without appreciably modifying accepted isothermal distillation techniques.

It is a further object of this invention to provide an improved apparatus, as aforesaid, which is more easily loaded, cleaned, and manipulated than prior art apparatus, which does not require a glass blower's assistance for the effective use thereof and which employs a separate solvent reservoir in order to give a shorter equilibration time.

It is a further object of this invention to provide an improved apparatus, as aforesaid, which will not be appreciably, if any, more expensive than apparatus of the prior art.

Other objects and advantages of this invention will become apparent to those acquainted with equipment of this type upon reading the following description and inspecting the accompanying drawing in which.

Figure 1:
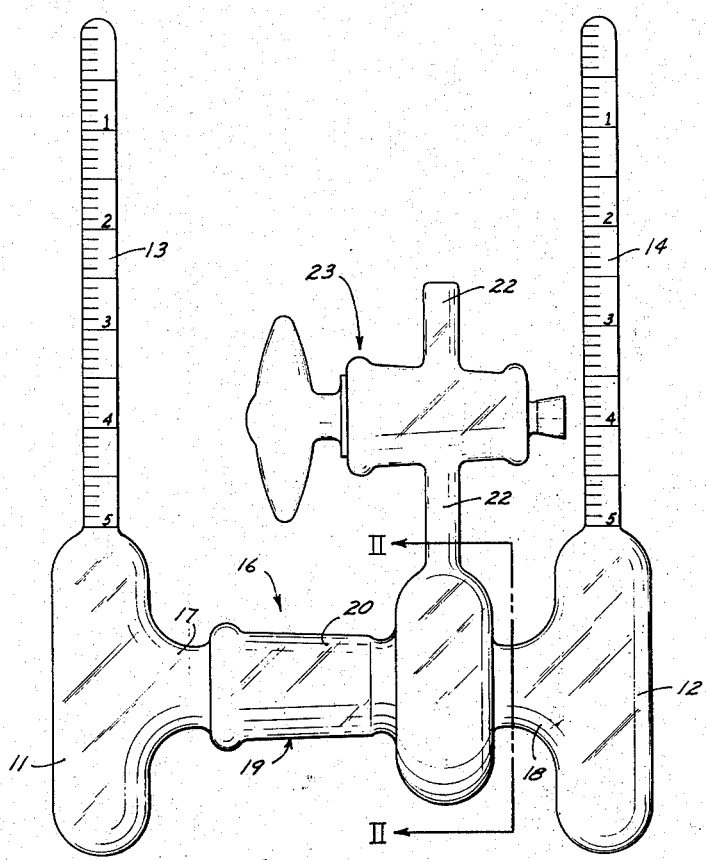
Figure 1 is a side elevational view of the apparatus.
Figure 2:
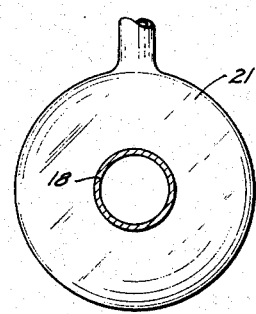
Figure 2 is a sectional view taken along the line II—II of Figure 1.

Referring to the drawing, the apparatus consists of two elongated bulbs 11 and 12, which have graduated tubes 13 and 14, respectively, extending upwardly from the upper axial ends thereof. The graduated tubes 13 and 14 are, preferably, substantially parallel with each other and are coaxial with the axes of the bulbs 11 and 12, respectively.

The bulbs 11 and 12 are connected by a bridge 16. The bridge includes tubular legs 17 and 18 extending from the sides of the bulbs 11 and 12, respectively. The tubular leg 17 is connected through a suitable fluid-tight, separable joint 19 to the solvent reservoir 21. The joint 19 may, desirably, be of the ground glass type including a female part 20 which is directly connected to one side of the solvent reservoir 21. The tubular leg 18 is herein shown as being directly connected to the other side of the solvent reservoir 21. It will be apparent that it could also be so connected through a suitable separable joint, similar to joint 19, if such is desired or required. The solvent reservoir 21 is substantially circular in cross-section and is herein shown as being in the form of a symmetrical spherical segment. The diameter of the female part 20 of the joint 19 and the diameter of the tubular leg 18 are appreciably less than the diameter of the solvent reservoir 21, said parts 18 and 20 being herein shown as being of diameter about one third of the solvent reservoir diameter. An outlet tube 22 extends upwardly from the solvent reservoir 21. A stopcock 23 is provided in the outlet tube 22 of the purpose of opening or closing the outlet tube.

*Operation*

During loading of the apparatus the joint 19 is separated. A predetermined weight of the substance of known molecular weight is deposited in one of the bulbs, preferably the bulb 12, in any suitable manner, such as by extending a weighing tube containing a known weight of the known substance through the female part 20, reservoir 21 and leg 18 into the bulb 12. Usually about 3 to 20 milligrams of the known substance is deposited into the bulb. A small amount, as from 0.1–0.3 ml., of the solvent is placed in the bulb, the amount of solvent being chosen so that it is the minimum capable of putting the known substance into solution. A predetermined weight of unknown substance is placed in the other bulb, here the bulb 11, in a similar manner. Usually, if the molecular weight of the unknown can be estimated, the weights of the known and unknown substances placed in the respective bulbs are in proportion to what their molecular weights are believed to be. A small amount of solvent, as from 0.1–0.3 ml. is placed in the bulb 11 with the unknown substance, the amount of solvent being chosen so that it is the minimum amount necessary to place the unknown substance in solution. A further quantity of solvent, which is usually about 0.5 ml., is placed in the solvent reservoir 21. The respective parts of the joint 19 are then brought together in fluid-type relationship. Where a conventional ground glass joint is used, it is usually desirable to use a suitable sealant, such as a high vacuum grease or Kronig cement between the respective parts of the glass joint. The assembled apparatus may then be secured in such condition, if necessary or desirable, by suitable means, such as a rubber band.

The outlet tube 22 is then connected to a suitable source of vacuum and the stopcock 23 is opened so that the interior of the apparatus is evacuated. Application of vacuum to the apparatus is continued until there has been a slight evaporation of the solvent. Thereupon, the stopcock is closed and the apparatus is disconnected from the vacuum source. The apparatus is then subjected to a constant temperature source, such as by being immersed in a constant temperature bath. The apparatus will be positioned so that the graduated tubes 13 and 14 will extend vertically upwardly while the apparatus is being held at the constant temperature. Usually, though not necessarily, the apparatus is subjected to a constant temperature of about 40° C., this temperature having been found to be the most desirable for carrying out the usual isothermal distillation process. The apparatus will be maintained at the constant temperature for a suitable period of time, which may be for about 48 hours. Usually, this time period is sufficient to establish equilibrium. At the end of this time period, the solvent in the reservoir will have been absorbed by the respective solutions in proportion to their respective molar concentrations so that the respective solutions become equimolar. Usually, some of the solvent remains in the reservoir at equilibrium. The apparatus is then removed from the constant temperature source and dried and is turned slowly about the axis of the bridge so that solutions in the respective bulbs run into the graduated tubes. It will be observed that, since the diameter of the reservoir is materially larger than the diameter of the legs extending therefrom and since such legs extend from the central portion of the reservoir, the solvent remaining in the reservoir will flow around the walls thereof and will be retained therein and will not pass into the bulbs 11 and 12 or the graduated tubes connected thereto. With the solution in the respective tubes, the tubes may then be subjected to further conventional treatment, such as jarring to remove bubbles. After a suitable time the volumes of fluid in the tubes may be read.

Usually, to check the readings thus obtained, the apparatus will be replaced in the constant temperature source for a further period of, for example, 24 hours and will then be checked for the volume of the fluid in the respective bulbs as before. The volumes should remain constant if the solutions in the bulbs have attained equilibrium.

The molecular weight of the unknown may be calculated from the final data obtained by substitution in the following formula:

$$m_1 = \frac{g_1 m v}{g v_1}$$

where:

$m$ equals molecular weight of known substance.
$v$ equals volume of solution of known substance.
$g$ equals weight of known substance.
$m_1$ equals molecular weight of unknown.
$v_1$ equals volume of solution of unknown.
$g_1$ equals weight of unknown.

*Examples*

The following examples, using benzoic acid as the known substance, and acetone as a solvent, indicate the utility of the apparatus.

| Unknown Substance | Sample Wt., mg. | Mol. Wt. Theory | Mol. Wt. Found |
|---|---|---|---|
| Progesterone | 14.782 | 314.6 | 326 |
|  | 10.529 | 314.6 | 314 |
|  | 9.847 | 314.6 | 317 |
| Salicylic Acid | 10.910 | 138.1 | 145 |
|  |  | 138.1 | 141 |
| Benzoic Acid | 9.125 | 122.1 | 133 |

The isothermal distillation process may be carried out using pure volatile solvents with a high vapor pressure, common solvents used for this purpose being acetone, chloroform, ethyl ether, ethyl formate, as well as others known to the art. The known substances which may be used in the isothermal distillation process are also known to the art, suitable known substances being azobenzene and benzoic acid.

Thus, although a particular, preferred embodiment of the invention has been described in detail hereinabove for illustrative purposes, it will be understood that variations or modifications thereof, which lie within the scope of such disclosure, are fully contemplated unless specifically stated to the contrary in the appended claims.

I claim:

1. An isothermal distillation apparatus, comprising: a reservoir having a substantially circular chamber; first and second pipes communicating substantially coaxially with said chamber on opposite sides thereof, said pipes being of smaller diameter than said chamber; outlet means communicating with said chamber; a third pipe releasably secured at one end by a fluid tight connection to the other end of said first pipe; a pair of bulbs connected to the other ends of said second and third pipes; and a pair of graduated tubes respectively connected to said bulbs and extending therefrom substantially perpendicularly to the axis of said chamber.

2. An isothermal distillation apparatus, comprising: a reservoir having a substantially circular chamber; first and second pipes communicating at one end of each substantially coaxially with the opposite axial ends of said chamber, said pipes being of smaller diameter than said chamber; outlet means communicating with said chamber near its periphery; a third pipe releasably secured at one end by a fluid tight connection to the other end of said first pipe; a pair of bulbs connected respectively to the other ends of said second and third pipes; and a pair of tubes respectively connected to said bulbs and extending therefrom in approximately the same direction and substantially perpendicularly to the axis of said chamber.

References Cited in the file of this patent

Childs: "Anal. Chem.," vol 26, #12, pages 1963–4, December 1954.